(Model.)

J. P. FULGHAM.
Seeding Machine.

No. 239,759.   Patented April 5, 1881.

Witnesses:
W. H. H. Knight
W. Blackstock

Inventor:
Jesse P. Fulgham
by E. A. Ellsworth
His Attorney

UNITED STATES PATENT OFFICE.

JESSE P. FULGHAM, OF RICHMOND, INDIANA, ASSIGNOR OF ONE-HALF TO WAYNE AGRICULTURAL COMPANY, OF SAME PLACE.

SEEDING-MACHINE.

SPECIFICATION forming part of Letters Patent No. 239,759, dated April 5, 1881.

Application filed February 8, 1881. (Model.)

*To all whom it may concern:*

Be it known that I, JESSE P. FULGHAM, of Richmond, in the county of Wayne and State of Indiana, have invented a new and useful Improvement in Seeding-Machines; and I do hereby declare the following to be a full, clear, and exact description of the same, which will enable others skilled in the art to which my invention appertains to make and use it, reference being had to the accompanying drawings, forming part of this specification, wherein—

Figure 1:
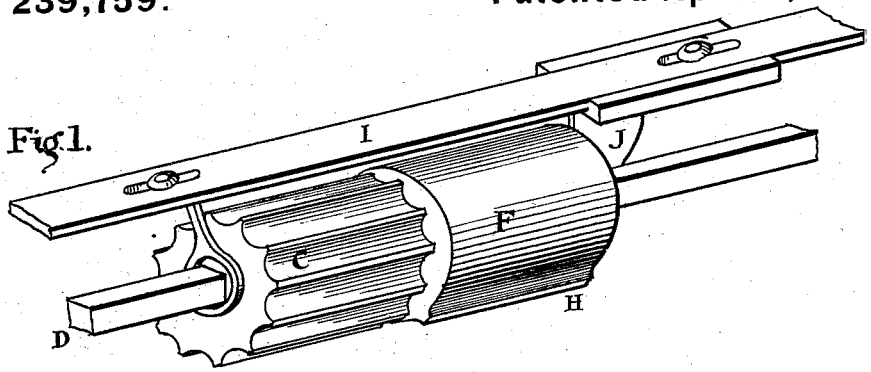
Figure 3:
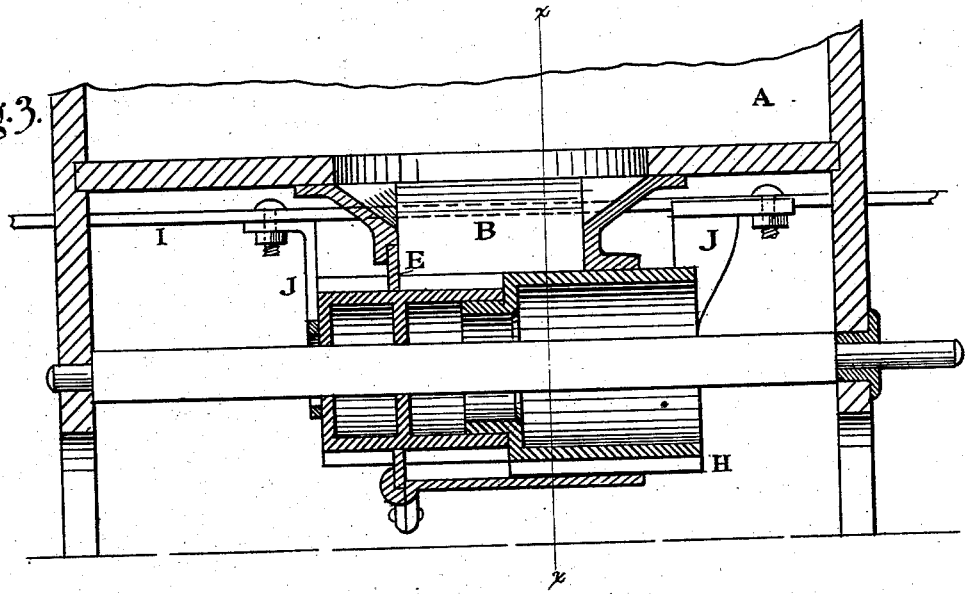
Figure 2:
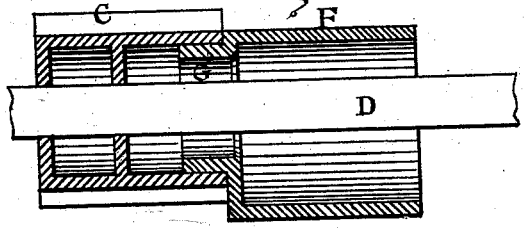
Figure 4:
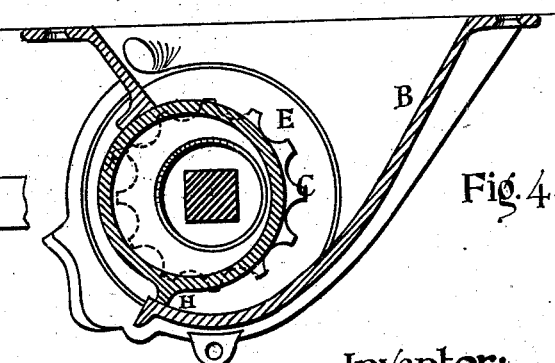

Figure 1 is a perspective view of the feed-wheel, the sleeve, and their actuating-bar detached from the seed-cup. Fig. 2 is a horizontal section of the feed-wheel and sleeve. Fig. 3 is a longitudinal vertical section through the feed-wheel, the sleeve, the seed-cup, and a portion of the hopper; and Fig. 4 is a vertical section taken in the plane of the line *x x*, Fig. 3.

Similar letters of reference denote like parts in the several figures of the drawings.

My invention relates to that class of force-feed seeding-machines in which the seed-cups that receive the grain from the hopper are each provided with an adjustable toothed feed-wheel and a sleeve to follow the adjustments of the wheel. The feed-wheels are rotated by a central shaft, and adapted for longitudinal movement to slide through a rotary scalloped head or rosette in one side of the cup, for the purpose of regulating the carrying capacity of the wheel for sowing the required quantity of grain to a given area of ground. The sleeves are by the same operation moved with the feed-wheels through the opposite side of the seed-cups, and serve to prevent any grain from passing through the cups, excepting such as is forced out by the action of the feed-wheels.

In order to prevent the grain from bridging over the recesses between the teeth of the wheels, and thereby cause an interrupted and irregular discharge, it is necessary that the ends as well as the tops of the teeth on the feed-wheels shall act upon the grain. This produces the most effective and positive feed, and is first shown in Letters Patent No. 145,795, granted to me, dated December 23, 1873, and reissued August 10, 1880, Reissue No. 9,341.

A necessary accompaniment of this important improvement is a cut-off of some kind to prevent the grain from flowing out of the seed-cup over the front of the sleeve and feed-wheel, which cut-off, as shown in my said patent, consists of a top wing adjustable with the sleeve and wheel.

My present invention has for its object to simplify and improve the construction and operation of this feed; and to this end it consists in the combination of a feed-wheel and sleeve of substantially the same diameter, the sleeve being journaled eccentrically in the end of the wheel, so as to form its own cut-off on the upper side, within the seed-cup, without the use of a cut-off wing, and to project the teeth of the wheel into the cup beyond the periphery of the sleeve, so as to expose their ends and tops for action upon the grain in rear of and beneath the wheel.

It also consists in the combination, with a seed-cup, of a feed-wheel and cut-off sleeve, set eccentrically to each other, and adapted for adjustment through the cup to regulate the quantity of grain to be discharged.

It also consists in the combination, with a seed-cup and a rotary scalloped head or rosette in one side of the cup, of the feed-wheel and cut-off sleeve, set eccentrically to each other, so that the sleeve shall form a cut-off at the top, while the wheel shall move concentrically through the scalloped head when the feed is adjusted.

It also consists in the combination of the feed-wheel and cut-off sleeve, set eccentrically to each other, with the seed-cup and the actuating-bar.

In the accompanying drawings, A represents a portion of the seed box or hopper of a seeding-machine, and B one of the seed-cups attached to the under side thereof to register with a seed-opening in the bottom.

C is the fluted or toothed feed-wheel, centered upon a squared operating-shaft, D, and passing through the scalloped head or rosette E, which rotates on its periphery, in one side of the seed-cup.

F is the sliding sleeve, of substantially the same diameter as the feed-wheel C, and formed with a short eccentric hub, G, by which it is journaled eccentrically into the end of the feed-wheel, so that the latter shall turn freely thereon. The sleeve passes through that side of the cup opposite the rosette, and, by reason of its diameter and eccentric position, the upper side forms a top cut-off, to prevent the grain from passing to the front between it and the seed-cup, thereby dispensing with a cut-off wing for such purpose. The sleeve is prevented from turning with the feed-wheel by a rib, H, on its under side, that fits and slides in a notch in the side of the seed-cup. The eccentricity of the sleeve and feed-wheel projects the teeth of the latter into the body of the seed-cup beyond the periphery of the sleeve, as shown in Figs. 2 and 4, so that the seed shall come in contact with and receive the action of their ends, as well as edges and tops, and thereby feed it uniformly and with certainty out of the seed-cup.

Although the cut-off sleeve is placed eccentrically to the feed-wheel, yet the latter is concentric with the shaft D, and therefore slides through the rosette without being impeded by the sleeve, which, in its turn, is guided and supported by the walls of the opening in the opposite side of the seed-cup.

The feed-wheels and sleeves of the seeder may be adjusted in the seed-cups by an actuating-bar, I, in front of the cups, arranged by suitable means to slide longitudinally on the machine, and provided with adjustable brackets J, to bear against the outer ends of the sleeves and feed-wheels, as shown in Figs. 1 and 3; or they may be adjusted by securing them to the driving-shaft and moving it endwise in the customary manner.

In this example of my invention I have shown the eccentric sleeve and feed-wheel applied to a seed-cup with an elevated discharge; but they may be employed with seed-cups of other forms, if desired.

Having thus described my invention, what I claim is—

1. In a feed for seeding-machines, the combination of a toothed or ribbed feed-wheel and a cut-off sleeve, placed eccentrically to each other within the seed-cup, and adapted for adjustment therein, substantially as described, for the purpose specified.

2. In a feed for seeding-machines, the combination of a toothed or ribbed feed-wheel and a cut-off sleeve of substantially the same diameter, placed eccentrically to each other within the seed-cup, and adapted for adjustment therein, substantially as described, for the purpose specified.

3. In a feed for seeding-machines, the combination, with the seed-cup, of an adjustable feed-wheel and an adjustable sleeve of substantially the same diameter, placed eccentrically to each other within the case, so that the upper side of the sleeve shall form a top cut-off and the teeth of the feed-wheel shall project beyond the periphery of the sleeve into the body of the cup, to act with their ends and tops upon the grain therein, substantially as described, for the purpose specified.

4. In a feed for seeding-machines, the combination, with the seed-cup and the scalloped head or rosette, adapted for rotation in one side thereof, of the adjustable feed-wheel and cut-off sleeve, placed eccentrically to each other, substantially as described, for the purpose specified.

5. In a feed for seeding-machines, the combination, with the seed-cup and actuating-bar, of a toothed feed-wheel and a cut-off sleeve, placed eccentrically to each other, substantially as described, for the purpose specified.

6. A feed mechanism for seeding-machines, consisting of a seed-cup, a rotary scalloped head in one side of said cup, a toothed feed-wheel and a cut-off sleeve of equal diameter, set eccentrically to each other, and both adapted to slide longitudinally through the cup, the wheel traversing and rotating with the rosette, and the sleeve moving through the opposite side of the cup without rotating, substantially as described, for the purpose specified.

The foregoing specification of my invention signed by me this 21st day of January, A. D. 1881.

JESSE P. FULGHAM.

Witnesses:
PHILIP S. GOODWIN,
E. A. ELLSWORTH.